July 30, 1963  G. R. ANDERSON ET AL  3,099,303
FRUIT HALVING APPARATUS
Original Filed Feb. 3, 1958  6 Sheets-Sheet 1
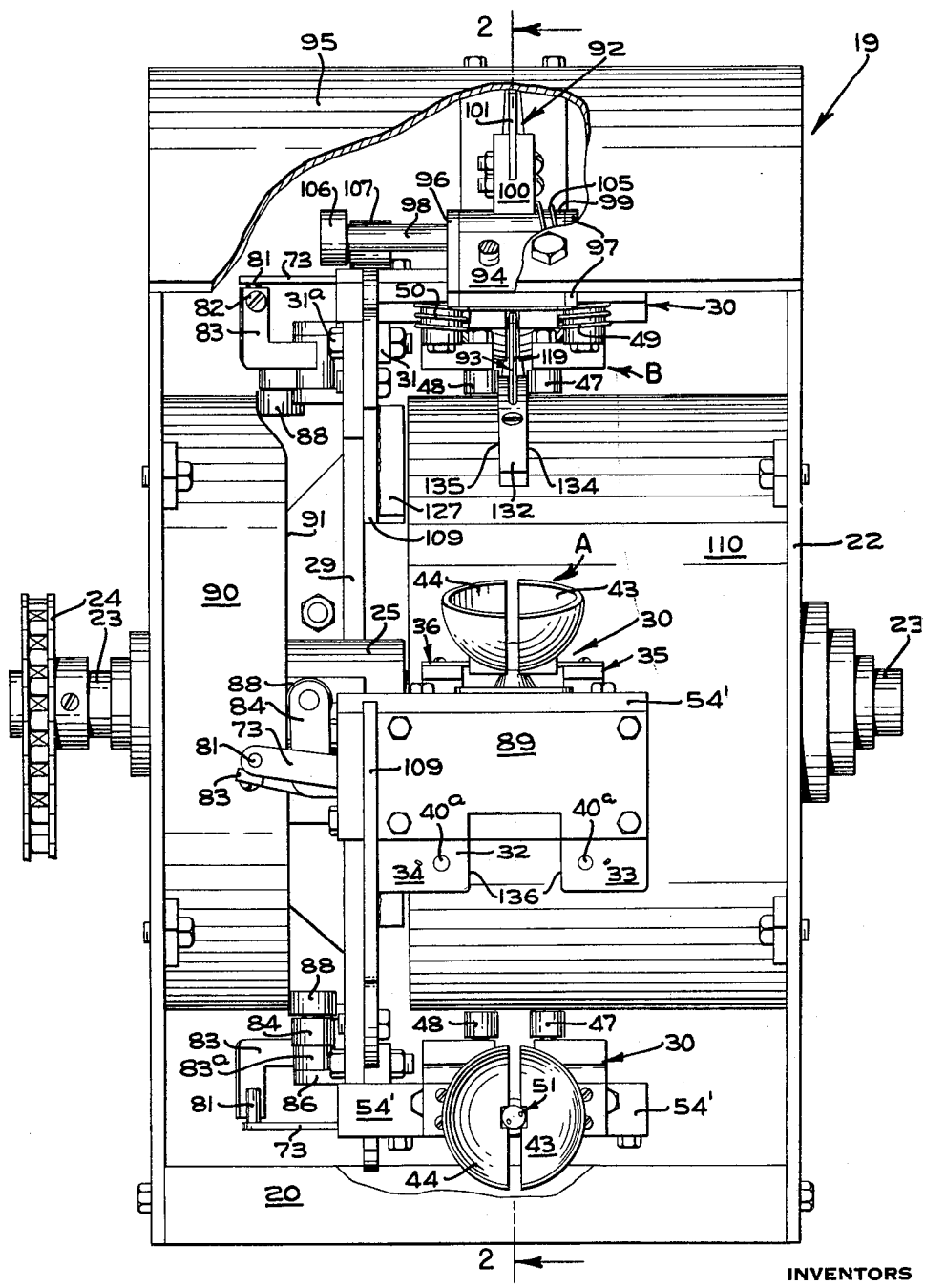
FIG_1
INVENTORS
GERALD R. ANDERSON
JOHN BOYCE
BY Hans G. Hoffmeister
ATTORNEY

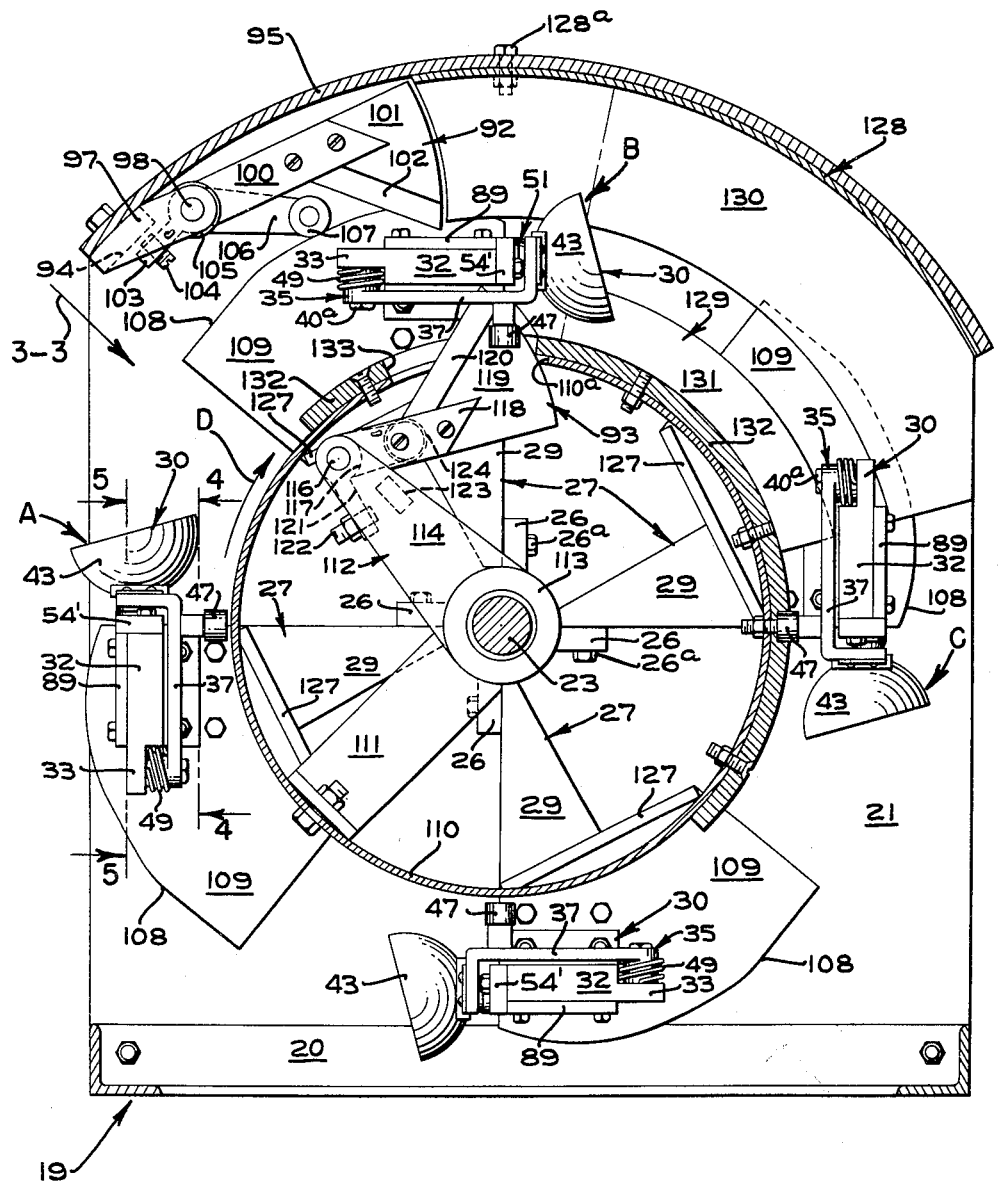

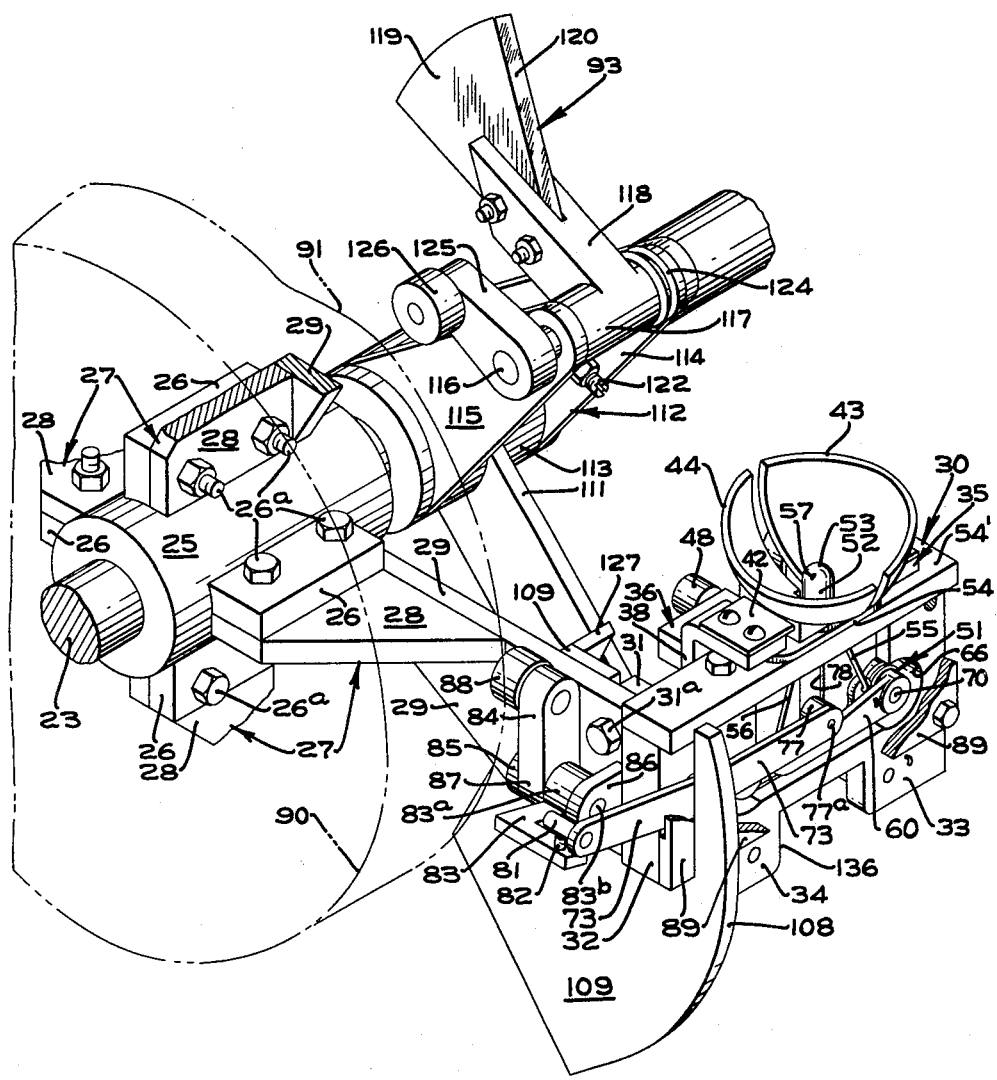

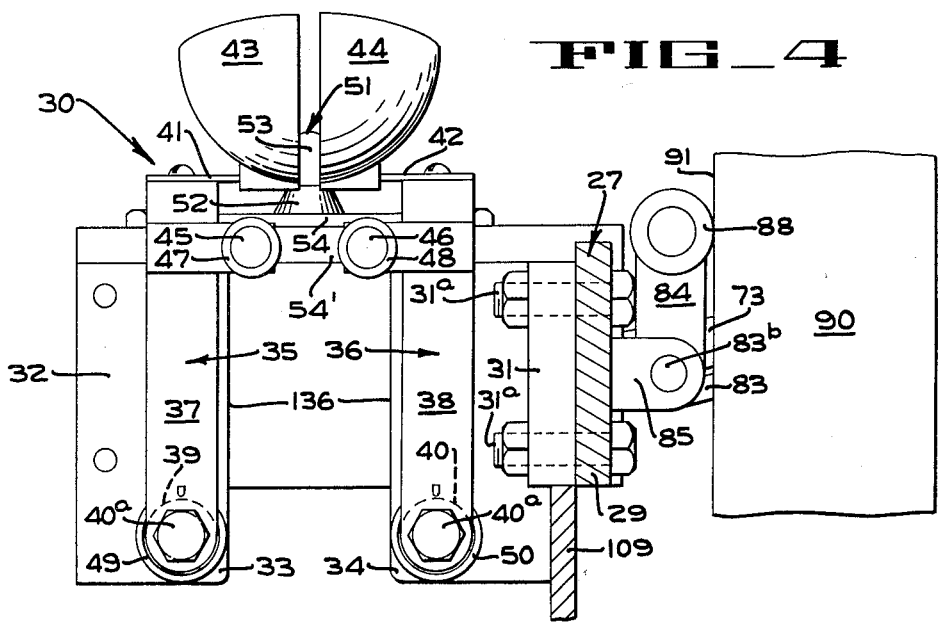
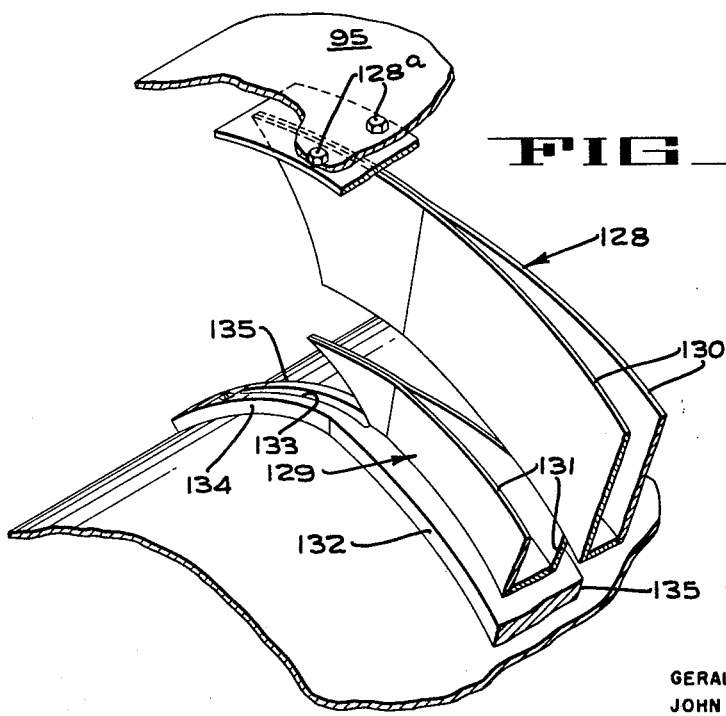
INVENTORS
GERALD R. ANDERSON
JOHN BOYCE
BY *Hans G. Hoffmeister*.
ATTORNEY July 30, 1963   G. R. ANDERSON ET AL   3,099,303
FRUIT HALVING APPARATUS
Original Filed Feb. 3, 1958   6 Sheets-Sheet 5
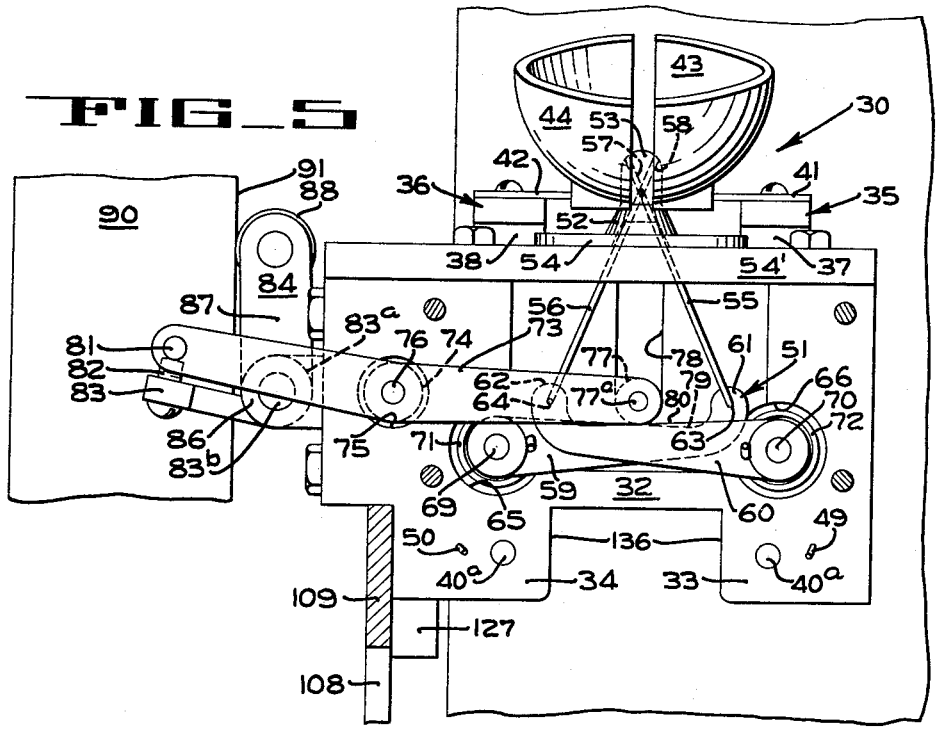
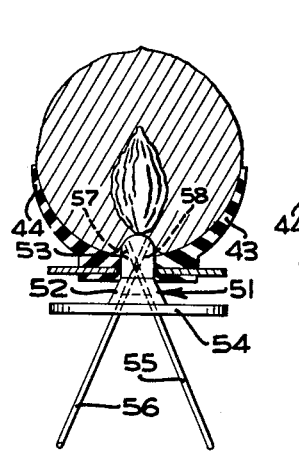
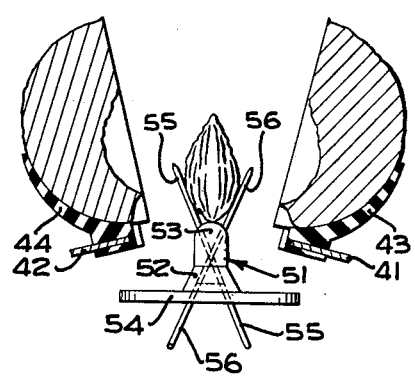
INVENTORS
GERALD R. ANDERSON
JOHN BOYCE
BY *Hans G. Hoffmeister*
ATTORNEY July 30, 1963
G. R. ANDERSON ET AL
3,099,303
FRUIT HALVING APPARATUS
Original Filed Feb. 3, 1958
6 Sheets-Sheet 6
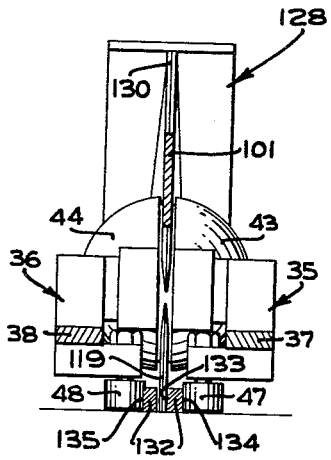
FIG_11
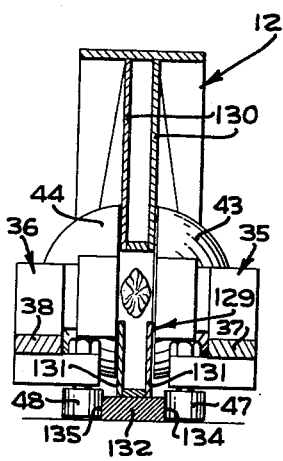
FIG_12
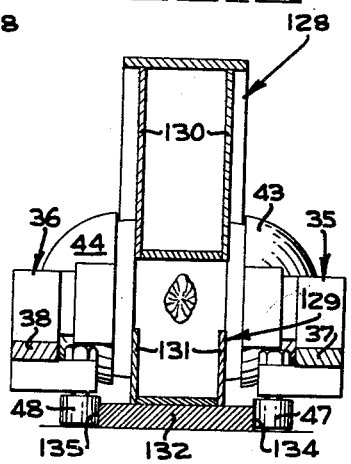
FIG_13
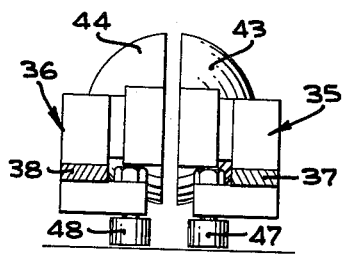
FIG_14
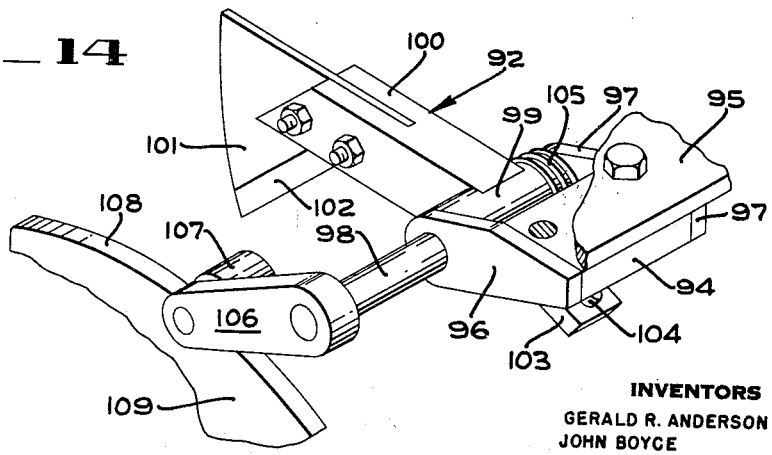
FIG_9
INVENTORS
GERALD R. ANDERSON
JOHN BOYCE
BY Hans G. Hoffmeister
ATTORNEY

United States Patent Office 3,099,303
Patented July 30, 1963

3,099,303
FRUIT HALVING APPARATUS
Gerald R. Anderson, Campbell, and John Boyce, San Jose, Calif., assignors to FMC Corporation, San Jose, Calif., a corporation of Delaware
Original application Feb. 3, 1958, Ser. No. 712,841, now Patent No. 3,040,793, dated June 26, 1962. Divided and this application Sept. 29, 1961, Ser. No. 141,728
4 Claims. (Cl. 146—72)

This application is a division of our copending application Serial No. 712,841 filed February 3, 1958, now U.S. Patent No. 3,040,793.

The present invention relates in general to apparatus for processing fruit, and more particularly to method of and apparatus for pitting and halving of drupes.

An object of the present invention is to provide an improved freestone peach pitting apparatus.

Another object of the present invention is to provide an apparatus wherein the halves of a freestone drupe, such as a peach or apricot, are separated from the pit thereof with minimum damage to the flesh of the drupe.

Another object of the present invention is to provide an apparatus that facilitates the halving of peaches and the like.

Another object of the present invention is to provide an improved knife assembly for a fruit pitting apparatus wherein a knife is urged into cutting relation with a fruit and yet yields when engaging the pit of the fruit.

Other objects and advantages of the present invention will become apparent from the following description and drawings in which:

FIG. 1 is a side elevation of the peach pitting apparatus embodying the present invention with a portion of the upper knife cover broken away.

FIG. 2 is a vertical section taken along line 2—2 of FIG. 1.

FIG. 3 is an enlarged fragmentary perspective of the lower knife and feeder assembly with the shaft, bracket and cover thereof in section, the view being taken generally in the direction of arrow 3—3 of FIG. 2.

FIG. 4 is an enlarged section taken along line 4—4 of FIG. 2.

FIG. 5 is an enlarged section taken along line 5—5 of FIG. 2.

FIGS. 6, 7, and 8 are diagrammatic illustrations showing the positions of the pit holding pins during the halving operation.

FIG. 9 is an enlarged fragmentary perspective of the upper knife and cam assembly with the cam and bracket portion thereof broken away.

FIG. 10 is an enlarged fragmentary perspective of the upper and lower wedges.

FIGS. 11, 12, 13 and 14 are diagrammatic illustrations of the wedging operation to separate the halves of the peach.

The apparatus embodying the present invention will be described with respect to freestone peaches, but it is to be understood that this apparatus may be used equally well with other freestone drupes, such as apricots. Accordingly, the present invention is not to be restricted to a freestone peach pitting and halving apparatus, but may encompass other fruit pitting and halving apparatus.

In the present invention, a frame structure 19 (FIG. 1) having a base 20 and upstanding side members 21 and 22 supports a horizontally disposed drive shaft 23, which is journalled for rotation in suitable bearings in the side members. A conventional sprocket and chain drive arrangement 24 is connected between a source of power and the shaft 23 for imparting a continuous rotary movement to the shaft in the direction shown by arrow D (FIG. 2).

A hub 25 (FIG. 3) is keyed to the shaft 23 for rotation therewith and has fixedly secured thereto, as by welding, a plurality of radially projecting bracket mounting bars 26, which are centrally disposed between the extremities of the hub and spaced at equal intervals therearound. In the preferred embodiment, there are four such bracket mounting bars. Extending radially outward from the hub 25 and in abutting engagement with each of the mounting bars 26 is a feeder support bracket 27 (FIGS. 2 and 3) which comprises a laterally extending plate 28 secured to its associated mounting bar 26 by bolts 26a. Each feeder bracket 27 also includes a vertical leg 29, which extends at right angles to the plate 28 and supports a fruit conveying and orienting unit 30. Thus, a plurality of units 30 (FIGS. 1 and 2) are carried by the hub 25 for continuous movement in a rotary path and are spaced around the hub at equal intervals.

The peach feeder assemblies 30 are similar in structure so that a description of one applies equally to the others. Accordingly, like reference numerals have been utilized for similar elements of the feeder assemblies. Each feeder assembly 30 comprises a feeder body mounting bar 31 (FIGS. 2, 3, and 4) which is secured to the depending leg 29 of its associated bracket 27 by bolts 31a. Extending in a direction generally parallel to the hub 25 and spaced therefrom is a feeder body member 32 (FIG. 4) which is supported by and fixedly secured to each of the mounting bars 31 by suitable means, such as welding. Each body member 32 has projecting therefrom a pair of spaced flanges 33 and 34 (FIG. 4). A pair of feeder cup support arms 35 and 36 are pivotally mounted on the spaced flanges 33 and 34, respectively.

The feeder cup support arms 35 and 36 (FIG. 4) comprise body portions 37 and 38, respectively, which are disposed adjacent the body member 32 and generally parallel thereto. At one end of the body portions 37 and 38 are laterally disposed hubs 39 and 40, respectively, each of which receives a bolt 40a. The bolts 40a are received by suitable tapped holes in the flanges 33 and 34 for pivotally mounting the feeder cup support arms 35 and 36, respectively. At the other end of the body portions 37 and 38 of the arms 35 and 36 are laterally disposed peach cup mounting plates 41 and 42, respectively (FIGS. 4 and 5), which are generally parallel to and extending in the same general direction as the hubs 39 and 40. Secured to the mounting plates 41 and 42, as by being fused thereon, are peach positioning and holding cup members 43 and 44, respectively, which are made of suitable resilient material, such as rubber or plastic, so as not to bruise any fruit placed thereon. Each of the peach positioning and holding members 43 and 44 of each feeder assembly is in the form of a partial cup bisected or slotted in a vertical plane perpendicular to the axis of the shaft 23 and is inclined upwardly, when the feeder assembly reaches the feeding station A (FIG. 2).

Thus, each feeder assembly 30 comprises a pair of cup members 43 and 44 for holding and positioning the peach deposited thereon. When a feeder assembly reaches station A (FIGS. 1 and 2), an operator places a peach on the cup members 43 and 44 associated therewith with the indentation at the stem end of the peach projecting downwardly.

As previously described, the cup members 43 and 44 are carried by support arms 35 and 36, respectively, which are pivotally mounted on the flanges 33 and 34, respectively, of the associated feeder assembly. After the peaches are bisected, in a manner to be described hereinafter, it is desirable to spread apart the peach halves. Therefore, the cup members 43 and 44 carrying the peach halves are moved apart so as to increase the space therebetween. For increasing the separation between cup members 43 and 44, the body portions 37 and 38 of the cup support arms 35 and 36, respectively, have laterally disposed pins 45 and 46, which carry cam follower rollers 47 and 48, respectively (FIGS. 1 and 4). When the rollers 47 and 48 are engaged by a cam moving therebetween, the cup support arms 35 and 36 pivot to widen the space between the cup members 43 and 44. To urge the cup members 43 and 44 toward one another, torsion springs 49 and 50 (FIGS. 1 and 4) encompass the cylindrical hubs 39 and 40, respectively. Each torsion spring has one end anchored in the body member 32 and the other end anchored in the associated cup support arms 35 or 36.

Thus, the cup members 43 and 44 are carried individually by support arms 35 and 36, which are pivotally mounted to the body members 32 of each feeder assembly 30. When the rollers 47 and 48 are engaged by a cam moving therebetween, the arms 35 and 36 are pivoted outwardly to move the cup members 43 and 44 away from one another. The arms 35 and 36 are spring loaded by torsion springs 49 and 50, respectively, to urge the cup members 43 and 44 toward one another.

During the halving operation, which will be described hereinafter, the pit of the peach is restrained from sidewise movement while the flesh of the peach is separated therefrom. For this purpose, a pit restraining or holding assembly 51 (FIG. 5) is provided for each peach feeder assembly 30. Each pit restraining assembly 51 comprises a prong guide 52 (FIGS. 3 and 5) having at one end thereof a hemispherically shaped portion 53 upon which the stem end indent of a peach is placed (FIG. 6). The guide 52 continues in a cylindrical configuration and terminates with a tapered end portion, which is fixedly secured to a support member 54. The support member 54 is carried by a cover plate 54' (FIG. 5) of the associated feeder body member 32. Each guide 52 receives a pair of obliquely disposed pit restraining prongs or pins 55 and 56, which extend in obliquely disposed guide holes 57 and 58, respectively, so that when the pins are projected into a peach as seen in FIG. 7, the outer ends of the pins are on opposite sides of the peach pit. Hence, the pit is retained between the prongs 55 and 56.

For raising or lowering the pit restraining or holding pins 55 and 56 within the guide member 52, a pair of pivotal prong arms 59 and 60 (FIG. 5) are provided, which have arcuate end portions 61 and 62, respectively, at the distal ends thereof. The arcuate end portions 61 and 62 have suitable apertures 63 and 64, which receive bent end portions of the pit holding prongs 55 and 56. To pivotally mount the prong arms 59 and 60, which are disposed parallel to one another, to the feeder body member 32 of their associated feeder assembly 30, cylindrical recesses 65 and 66, respectively, are provided which receive the hub portions of the prong arms. The recesses 65 and 66 are provided in the feeder body member 32 and suitable mounting means are provided, such as studs 69 and 70, for retaining individually the hub portions of the arms 59 and 60 in assembled relation on the feeder body member 32.

To urge the pit holding prongs 55 and 56 upward within the guide member 52, torsion springs 71 and 72 (FIG. 5) are provided which encompass the hub portions of the arms 59 and 60, respectively, and interengage the prong arms 59 and 60, respectively, and the associated body member 32. For retracting the pins 55 and 56, as shown in FIG. 6, each pit holder assembly 51 is provided with an actuating lever 73 (FIGS. 3 and 5), which has a tubular arm 74 intermediate its ends. The arm 74 is received in a bore 75 of the associated feeder body member 32. A suitable pivot pin 76 is received by a bearing sleeve (not shown) in the arm 74 for holding the lever 73 on the body 32 and for providing pivotal movement to the actuating lever 73. At one end of the actuating lever 73 is provided a roller 77, which is mounted on a stud 77a. To provide clearance for the stud 77a, a slot 78 (FIG. 5) is formed in the associated feeder body member 32. The slot 78 is disposed below the prong guide member 52 intermediate the ends of the body member 32. The roller 77 engages camming surfaces 79 and 80 of the prong arms 59 and 60, respectively, and when moved away from the guide member 52, retracts the pit holding prongs 55 and 56. The other end of the actuating lever 73 carries a laterally projecting pin 81 (FIG. 3) which engages an adjusting screw 82. The adjusting screw 82 is received in threaded engagement by an angularly disposed plate 83 of a cam following arm 84, which has a hub portion 83a pivotally mounted on a pin 83b extending between laterally projecting ears 85 and 86 (FIG. 3) of the depending leg 29 on the feeder bracket 27. The follower arm 84 also includes a body portion 87 which is welded to the hub 83a and carries a cam follower roller 88. The movement of the roller 88 in a clockwise direction, as shown in FIGS. 3 and 5, raises the plate 83 to pivot the actuating lever 73. In so doing, the roller 77 is moved away from the guide member 52 to engage the prong arms 59 and 60 and hence retracts the pit restraining prongs 55 and 56. When the cam follower 84 is not urged in the clockwise direction, the torsion springs 71 and 72 urge the prong arms 59 and 60 toward the cup members 43 and 44 to raise the prongs 55 and 56 within the guide member 52. The roller 77 moves toward the guide member 52 under the urgency of the arms 59 and 60, causing the actuating lever 73 to pivot in a counterclockwise direction.

To protect the components of the pit restraining assembly, a side cover plate 89 (FIG. 1) is secured to the body member 32 and has a slot aligned with the inwardly directed edges of the flanges 33 and 34.

From the foregoing description, it will be evident that the pit restraining prongs 55 and 56 are carried individually by their respective prong arms and are raised or moved longitudinally along divergent paths within the cup members 43 and 44 for penetrating a peach and engaging the outer surface of a peach pit (FIGS. 7 and 8) to retain the same centrally under the urgency of the spring loaded arms 59 and 60. The cam actuated lever 73 retracts the pins 55 and 56 (FIGS. 5 and 6) by engaging the prong arms 59 and 60. It is to be noted that the pit restraining prongs 55 and 56 are small in diameter so as to prevent objectional mutilation of the flesh of the fruit and further are diagonally disposed relative to one another so as to be effective in engaging pits of varying configuration.

When each feeder assembly 30 is at station A (FIGS. 1 and 2), which is the station for receiving a peach from an operator, the associated prongs 55 and 56 are fully retracted, as shown in FIG. 6. To actuate the lever 73 for retracting the pit holding prongs 55 and 56, a cylindrical cam 90 (FIG. 1) is secured to the side member 21 of the frame 20 by bolts. The cam roller 88, which engages an inwardly directed camming surface 91 of cam 90, causes the cam follower 84 to pivot the actuating lever 73 so as to move the prong arms 59 and 60 away from the guide member 52, in a manner previously described for retracting the pit holding prongs 55 and 56, respectively. The camming surface 91 is so arranged that as a feeder assembly leaves station A and approaches station B (FIGS. 1 and 2) the cam roller 88 permits the roller on the end of the actuating lever 73 to be moved toward the feeder cups 43 and 44. Consequently, the prong arms 59 and 60, under the urgency of the torsion springs 71 and 72, move the pit holding prongs 55 and 56 within the feeder cups 43 and 44, as shown in FIGS. 7 and 8. The prongs 55 and 56 remain in this position until the feeder assembly 30 approaches station C, at which time the roller 88 is again positioned by the camming surface 91 for retracting the prongs 55 and 56.

A peach is carried by one of the feeder assemblies 30 from station A to an upper stationary knife assembly 92 (FIG. 2) and a lower station knife assembly 93 located at station B. The upper stationary knife assembly 92 (FIGS. 2 and 9) is supported by a bracket 94, which is bolted to an arcuate cover plate 95 of the frame 20. The bracket 94 comprises a pair of spaced arms 96 and 97 (FIG. 9) having journalled therein a shaft 98. A knife holder sleeve 99 is disposed between the arms 96 and 97 and secured to the shaft 98 for rotation therewith. Projecting radially from the sleeve 99 and welded thereto is a knife holding lever arm 100, which has secured at one end thereof a vertically disposed knife blade 101 with its downwardly extending cutting edge 102 disposed in the vertical plane defined by the space between the cup members 43 and 44 of each feeder assembly 30. The other end of the lever arm 100 has an angularly disposed member 103 which receives an adjusting screw 104. The screw 104 engages the bracket 94 to limit the pivoting movement of the blade 101 and thereby control the cutting depth of the blade 101. A torsion spring 105 encompasses the sleeve 99, which spring interengages the arm 100 and the arm 97, to spring load the lever arm 100 for urging the blade 101 to a lower position. When the blade 101 engages a peach pit, the arm 100 is free to move upward as the spring 105 yields, thereby permitting the blade 101 to follow the contour of the peach pit.

After the upper knife blade 101 completes its cutting operation, it is retracted or raised (FIG. 2) to clear the trailing portion of the feeder assembly 30 carrying the bisected peach. For this purpose, the shaft 98 has secured thereto a follower arm 106, which projects radially therefrom and in the same general direction as the lever arm 100. The follower arm carries a cam roller 107, which engages an upper camming surface 108 of a cam 109 (FIGS. 2, 3, and 9). The cam 109 is carried by each of the feeder assemblies 30 and is secured to the feeder bracket 27 thereof. The upper camming surface 108 is contoured and arranged to raise the blade 101 after the blade has completed its cutting operation and maintains the blade in a raised condition until the trailing edge of the feeder assembly has passed station B. Thereupon, the blade 101 is lowered under the urgency of spring 105 to cut the succeeding peach carried by the succeeding feeder assembly.

The lower knife assembly 93 (FIGS. 2 and 3) comprises a bracket 112 which has a hub 113 receiving the shaft 23 and a support plate 111 which extends radially from the hub and is bolted to the inner wall of a cylindrical cover 110. As seen in FIG. 1, the cover 110 is bolted to the frame side member 22. Projecting radially upward from the tubular hub 113 are a pair of ears 114 and 115, which receive a pivotal shaft 116. A knife holder sleeve 117 is disposed between the ears 114 and 115 and receives the shaft 116 for movement therewith. Projecting radially from the sleeve 117 is a knife holding lever arm 118 of the lower knife assembly 93 which has secured at one end thereof a vertically disposed knife blade 119 with its upwardly extending cutting edge 120 disposed coplanar with the cutting edge 102 of the upper stationary blade 101. For adjusting the cutting depth of the lower knife blade 119, a radial arm 121 (FIG. 2) projects downwardly from the sleeve 117 in a continuation of the lever arm 118 and carries an adjusting screw 122, which engages a stationary bar 123, is welded horizontally between the ears 114 and 115 and when engaged by the screw 122 limits the upward pivoting movement of the lower blade 119 to thereby adjustably control the cutting depth of the blade 119. A torsion spring 124 encompasses the sleeve 117, which spring interengages the sleeve 117 with the ear 114, to spring load the lever arm 118 for urging the blade 119 to an upper position projecting through a slot 110a in cover 110. When the blade 119 engages a peach pit, the arm 118 is free to move downward as the spring 124 yields, thereby permitting the blade 119 to follow the contour of the peach pit.

After the lower knife blade 119 completes its cutting operation, it is retracted or lowered (FIG. 2) to clear the pit holding assembly 51 associated with the feeder assembly 30 carrying the bisected peach. For this purpose, the shaft 116 has secured thereto a follower arm 125 (FIG. 3), which projects radially therefrom and in the same general direction as the lever arm 118. The follower arm 125 carries a cam roller 126, which engages a lower camming flange 127 of the cam 109 (FIG. 3). As previously noted, the cam 109 is mounted on each of the feeder assemblies 30. The lower camming flange 127 is contoured and arranged to lower the blade 119 after the blade has completed its cutting operation and maintains the blade in a lowered position until the trailing edge of the feeder assembly has passed station B. Thereupon, the blade 119 is raised under the urgency of spring 124 to cut the succeeding peach carried by the succeeding feeder assembly. The body member 32 is slotted and the flanges 33 and 34 are spaced apart as to provide a passageway 136 (FIG. 4) for the lower knife blade 119.

Thus, when one of feeder assemblies 30 reaches station A, a peach is placed onto the cups 43 and 44 with its stem indent end downward and its suture in a vertical plane between the peach holding cups 43 and 44. The feeder assembly travels from station A in the direction shown by the arrow D for approximately one quarter of a revolution to the stationary spring loaded upper and lower knife assemblies 92 and 93 located at station B. The knife blades 101 and 119 are disposed in the plane defined by the space between the cups 43 and 44 so as to bisect the peach in the continued movement of the feeder assembly 30 in a vertical plane substantially along the suture of the peach. As the knife blades 101 and 119 complete their bisecting operation, camming surfaces 108 and 127, respectively, open the knife assemblies 92 and 93 to clear the pit holding assembly 51 associated with the feeder assembly at station B.

After the freestone peach is bisected, the halves thereof are separated and spread apart. During both the bisecting operation and the separating operation, the peach pit is centrally retained by the pit restraining prongs 55 and 56 of the feeder assembly 30. For separating and spreading apart the peach halves, an upper stationary wedge 128 and a lower stationary wedge 129 are provided. The upper stationary wedge 128 (FIGS. 2 and 10) is supported by the frame cover 95 by suitable means, such as bolts 128a, and comprises a wishbone portion 130 depending in a vertical plane coplanar with the upper stationary knife blade 101 in such a manner as to engage the upper portion of the peach halves without being in the path of travel of the pit holding assembly 51. The wishbone portion 130 has its narrowest section adjacent the knife blade 101 and gradually increases in width in the direction of travel of the feeder assemblies. The lower stationary wedge 129 (FIGS. 2 and 10) comprises a wishbone portion 131 upstanding in a vertical plane coplanar with the lower stationary knife blade 119 in such a manner as to engage the lower portion of the peach halves without being in the path of travel of the pit holder assembly 51. The wishbone portion 131 has its narrowest section adjacent the lower knife blade 119 and gradually increases in width in the direction of travel of the feeder assemblies. Thus, the wishbone wedges 128 and 129 separate the peach halves as illustrated diagrammatically in FIGS. 11–13, inclusive.

As previously described, the cup arms 37 and 38 are pivotally mounted and arranged to move the cup members 43 and 44 away from one another during the halving operation. For this purpose, a feed cup cam 132 (FIGS. 2 and 10) is provided, which is secured to the cover plate 110. The lower wedge 129 is secured to the cam 132. A slot 133 is provided in the cam 132 in alignment with slot 110a of the cover 110 to permit the lower knife blade 119 to be raised and lowered. The cam 132 is so arranged that the camming surface 134 is engaged by the cup roller 47 and the camming surface 135 is engaged by the cup roller 48 as the knife blades 101 and 119 penetrate the peach. The camming surfaces 134 and 135 have substantially oppositely directed bowed configurations. Thus, the rollers 47 and 48 continue in engagement with the surface 134 and 135, respectively, and the space therebetween gradually increases to increase the space between the cup members 43 and 44 until the wedges 128 and 129 have fully separated the peach halves from the pit, as shown in FIGS. 11–13, inclusive. The surfaces 134 and 135 of the cam 132 are arranged to taper off to permit the cup members 43 and 44 to move toward one another under the urgency of springs 49 and 50, respectively, after the wedging operation is completed.

After the feeder assembly 30 carrying the freestone peach leaves station B, the peach halves are separated from the pit. Continued movement of the feeder assembly 30 causes the peach halves to fall onto a suitable conveyor or platform, not shown, and the pit of the halved peach is free to fall upon another conveyor or platform, not shown.

In the operation of the freestone peach pitter and halving apparatus, the feeder assemblies 30 continuously rotate about the drive shaft 23. When each feeder assembly 30 reaches station A, an operator places a peach into the cup member 43 and 44 of the feeder assembly at station A with the stem indent end thereof projected downwardly and with the suture of the peach in a vertical plane between the cup members. The feeder assembly, while at station A, has the pit restraining prongs 55 and 56 associated therewith in a retracted position.

As each feeder assembly 30 approaches station B, the associated cam follower roller 88 engages the inwardly directed portion of the cam surface 91 on the cam 90 enabling the torsion springs 39 and 40 to urge the prong arms 59 and 60 upwardly for raising the pit restraining prongs 55 and 56. In so doing, the flesh of the peach is penetrated by the prongs 55 and 56 and the peach pit is centrally retained by the prongs 55 and 56. After the prongs 55 and 56 engage the peach pit, the peach is bisected by the upper stationary knife blade 101 and the lower stationary knife blade 119 in a vertical plane along the suture thereof. Each feeder assembly 30 has mounted thereon the knife cam 109. Accordingly, as the upper knife blade 101 cuts the upper portion of the peach, the upper knife cam follower roller 107 engages the camming surface 108 of cam 109 to raise the knife blade 101 out of the path of the pit restraining assembly 51. Similarly, the lower knife cam follower roller 126 engages the camming surface 127 of cam 109 to lower the knife blade 119 out of the path of the pit holding assembly 51.

Upon completion of the peach bisecting operation, the upper stationary wedge 128 and the lower stationary wedge 129 penetrate the peach to separate the peach halves from the pit. Simultaneously with the wedging operation, the rollers 47 and 48 engage the cam 132 to further and gradually increase the space between the feeder cup members 43 and 44. Thus, the peach halves are separated from the centrally held pit.

As each feeder assembly leaves station B, the upper knife blade 101 is lowered under the urgency of spring 105 and the lower knife blade 119 is raised under the urgency of spring 124 in preparation for bisecting the peach carried by the succeeding feeder assembly.

After each feeder assembly leaves station B the separated peach halves drop from the cup members 43 and 44 onto a suitable platform or conveyor (not shown). Subsequently, the pit holding pins 55 and 56 are retracted at station C, when the cam roller 88 engages an outwardly directed portion of the camming surface 91 on the cam 90 to permit the pit to fall onto another suitable conveyor or platform (not shown). At station C the follower rollers 47 and 48 disengage the cam 132 and assume their normal position under the urgency of springs 39 and 40, respectively, in preparation for receiving another peach at station A.

Whereas, the pitting and halving apparatus of the present invention has been described as being adapted for freestone peaches, it is to be understood that the inventive concept and features thereof may be employed for the pitting and halving of other drupes.

It will be understood that modifications and variations of the embodiment of the invention disclosed herein may be resorted to without departing from the spirit of the invention and the scope of the appended claims.

Having thus described our invention, what we claim as new and desire to protect by Letters Patent is:

1. In a fruit halving apparatus, an upper knife having a downwardly directed cutting edge, a holder for said upper knife, a first pivotal means for pivotally mounting said upper knife holder, a spring engaging said holder to urge said upper knife downwardly, a lower knife having an upwardly directed cutting edge coplanar with the cutting edge of said upper knife, a holder for said lower knife, a second pivotal means for pivotally mounting said lower knife holder, a spring engaging said lower knife holder to urge said lower knife upwardly, a fruit feeder mechanism, means for advancing said feeder mechanism toward said lower and upper knives, a cam carried by said feeder mechanism having an upper and lower camming surface, a first cam follower mounted on said first pivotal means and pivotable with said upper knife holder, said first cam follower being engageable with said upper camming surface of said cam to raise said upper knife out of the path of the trailing portion of said feeder mechanism after the cutting of the fruit, and a second cam follower mounted on said second pivotal means and pivotable with said lower knife holder, said second cam follower being engaged with said lower camming surface of said cam to lower said lower knife out of the path of the trailing portion of said feeder mechanism after the cutting of the fruit.

2. A knife assembly for a fruit cutting apparatus comprising a supporting frame, a first shaft rotatably mounted on said supporting frame, a first knife holder secured at one of its ends to said first shaft and rotatable therewith, said first knife holder having a knife with a cutting edge at the other of its said ends, a second shaft rotatably mounted on said supporting frame, a second knife holder secured at one of its ends to said second shaft and rotatable therewith, said second knife holder having a knife with a cutting edge coplanar with the cutting edge of said knife of said first knife holder and in opposed relation thereto, springs connected between said supporting frame and said first and second knife holders to urge said cutting edges together to cut the fruit in a single plane, and camming members secured to said first and second shafts and rotatable therewith, said camming members being relatively located to urge said cutting edges apart against the action of said springs when engaged and rotated by camming surfaces subsequent to the cutting of the fruit.

3. A knife assembly for a fruit cutting apparatus comprising an upper knife having a downwardly directed cutting edge, a holder for said knife, means pivotally mounting said knife holder, a spring engaged with said holder to urge said knife downwardly and permitting said knife to yield when engaged by a fruit pit, a lower knife having an upwardly directed cutting edge coplanar with the cutting edge of said upper knife, a holder for said lower knife, means pivotally mounting said lower knife holder, a spring engaged with said lower knife holder to urge said lower knife upwardly and permitting said lower knife to yield when engaged by a fruit pit, cam followers engaged with said upper and lower knife holders and pivotable therewith, said cam followers being relatively positioned within said assembly so as to positively separate said upper and lower knives a predetermined distance when actuated by a cam member, and abutment means pivotable with said upper and lower knife holders and operable to space said knife edges apart a fixed minimum distance against the urging of said springs.

4. In a fruit cutting apparatus, a support structure, a knife support bracket secured to said structure, a shaft rotatably mounted on said bracket, a knife holder secured to said shaft intermediate its ends, a knife carried at one end of said holder, an adjustable member carried at the other end of said holder and engageable with said bracket to limit the cutting depth of said knife, a spring engaging said bracket and said holder for normally urging said adjustable member into engagement with said bracket to cut the fruit, a cam follower carried by said shaft, a fruit feeder assembly mounted on said support structure for movement relative thereto, a cam mounted on said feeder assembly and arranged for engaging said cam follower, and means to advance said feeder assembly to cause said cam to engage said cam follower to move said knife holder against the urging of said spring and out of the path of the advancing feeder assembly.

References Cited in the file of this patent

UNITED STATES PATENTS

| 1,881,171 | Cooley | Oct. 4, 1932 |
| 1,926,965 | Bem | Sept. 12, 1933 |
| 2,403,516 | Gaddini | July 9, 1946 |
| 2,582,636 | Kruse et al. | Jan. 15, 1952 |
| 2,618,305 | Vanderhoofven | Nov. 18, 1952 |
| 2,664,932 | Gaddini | Jan. 5, 1954 |
| 2,808,863 | Gaddini | Oct. 8, 1957 |
| 2,858,863 | Lorenzen | Nov. 4, 1958 |